(12) United States Patent
Osborne et al.

(10) Patent No.: US 11,251,506 B2
(45) Date of Patent: Feb. 15, 2022

(54) BATTERY PACK AND TERMINAL

(71) Applicant: BLACK & DECKER INC., New Britain, CT (US)

(72) Inventors: Nathan J. Osborne, Glen Arm, MD (US); Nicholas J. Garibaldi, Bel Air, MD (US)

(73) Assignee: Black & Decker Inc., New Britain, CT (US)

( * ) Notice: Subject to any disclaimer, the term of this patent is extended or adjusted under 35 U.S.C. 154(b) by 104 days.

(21) Appl. No.: 16/359,463

(22) Filed: Mar. 20, 2019

(65) Prior Publication Data

US 2019/0296320 A1 Sep. 26, 2019

Related U.S. Application Data

(60) Provisional application No. 62/645,398, filed on Mar. 20, 2018.

(51) Int. Cl.
*H01M 50/543* (2021.01)
*H01M 50/20* (2021.01)
*H01R 13/11* (2006.01)

(52) U.S. Cl.
CPC ........ *H01M 50/543* (2021.01); *H01R 13/112* (2013.01); *H01R 13/113* (2013.01)

(58) Field of Classification Search
CPC ............. H01M 2/30; H01M 2/02; H01M 2/12
See application file for complete search history.

(56) References Cited

U.S. PATENT DOCUMENTS

| 2009/0011664 A1* | 1/2009 | Laurx | H01R 12/724 439/884 |
| 2012/0082885 A1* | 4/2012 | Matthias | H01M 50/20 429/158 |
| 2016/0020443 A1* | 1/2016 | White | H01M 10/4207 318/245 |

* cited by examiner

*Primary Examiner* — Kenneth J Douyette
(74) *Attorney, Agent, or Firm* — Michael Aronoff

(57) ABSTRACT

A battery terminal having a pair of contact tulips that mate with a device terminal in a mating direction. The first of the pair of contact tulips mates with the device terminal in a first contact plane and the second of the pair of contact tulips mates with the device terminal in a second contact plane. The first contact plane is generally parallel to the contact plane. Both the first and the second contact planes are generally perpendicular to the mating direction. The resistance between the first tulip and the device terminal is approximately half the resistance between the second tulip and the device terminal.

7 Claims, 12 Drawing Sheets

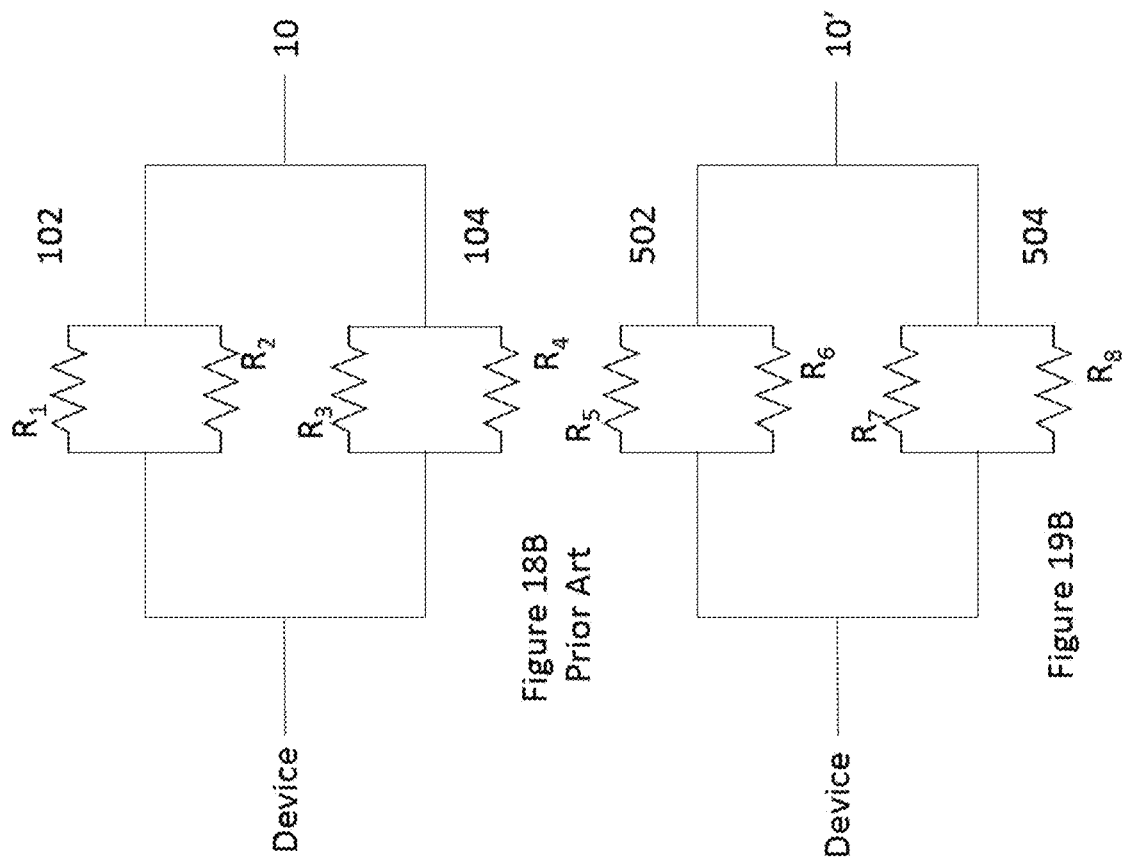
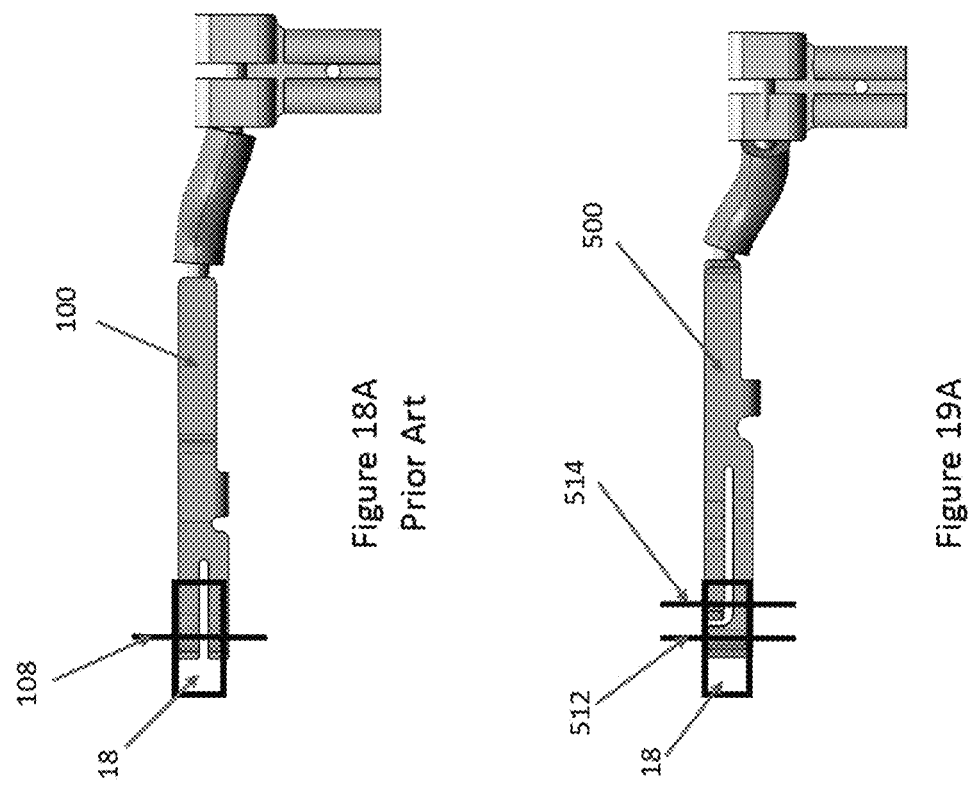

BATTERY PACK AND TERMINAL

TECHNICAL FIELD

This application relates to a battery pack and a terminal for use in a battery pack. In one implementation, the battery pack includes a housing, at least one opening in the housing and at least one terminal. The opening allows a terminal of a device to couple with the battery pack terminal.

BACKGROUND

As illustrated in FIG. 1, a battery pack 10 typically includes a housing 12. The housing 12 includes an interface for mating to a device, such as a power tool that receives power from the battery pack or a battery charger that provides power to the battery pack. The interface may include a set of rails and grooves for aligning with the device. The housing 12 also includes a set of openings 14. The exemplary housing 12 illustrated in FIG. 1 includes eight openings 14. The housing 12 may include more or less openings, as mandated by the electrical features of the interface. The openings 14 allow for access to a set of battery terminals positioned inside the housing. The terminals are configured to mate with corresponding terminals 18 of the device. The device includes a terminal block 20 that holds the set of device terminals 18 fixed relative to each other. The terminals may transmit power signals (relatively high current) to or from a set of battery cells in the housing 12 or data signals (relatively low current) to or from a printed circuit board inside the housing 12 or alternatively, both power signals and data signals.

FIGS. 2-4 illustrate a conventional battery terminal 100. The battery terminal 100 includes a first side 102 and a second side 104. Each side of the battery terminal 100 is bifurcated. The first side 102 includes an upper leg 102a and a lower leg 102b. The second side 104 includes an upper leg 104a and a lower leg 104b. The upper legs 102a, 104a form a first tulip 106a. The lower legs 102b, 104b form a second tulip 106b. The tulips 106a, 106b of each of the upper legs 102a, 104a and the lower legs 102b, 104b abut at a plane of contact 108. The battery pack 10 also includes a terminal block 16 that holds the set of terminals 100 fixed relative to each other.

As illustrated in FIGS. 3 and 4, when the device terminals 18 are inserted through the battery pack openings 14 and engage and mate with the battery terminals 100, the tulips 106a, 106b of each of the upper legs 102a, 104a and the lower legs 102b, 104b contact the device terminals 18 at the plane of contact 108.

As illustrated in FIG. 2, each of the first side upper and lower legs 102a, 102b and the second side upper and lower legs 104a, 104b of the battery terminal 100 have a height of A. As such, when the battery terminal 100 mates with the device terminal 18 there is a maximum contact area of A times the thickness of the plane of contact ($P_{Th}$) times four (4) (one for each of the first and second upper legs 102a, 104a at the first tulip 106a and one for each of the first and second lower legs 102b, 104b at the second tulip 106b $R_1$, $R_2$, $R_3$, $R_4$). As such, resistance R is relative to $A \times P_{Th} \times 4$.

When transmitting power (or data) signals (current) through the battery terminals 100 and the device terminals 18, in order to reduce losses due to heating, it is desirable to decrease the resistance through the circuit. As is well known, contact resistance varies inversely to contact area. And as there are four (4) equal contact areas ($R_1$, $R_2$, $R_3$, $R_4$), between the battery terminal and the device terminal and each area has an equivalent resistance of R ohms, the total equivalent resistance between the battery terminal and the device terminal can be calculated as:

$$R_{eq} = [1/R_1 + 1/R_2 + 1/R_3 + 1/R_4]^{-1} = R/4; \qquad (EQ. 1)$$

where $R_1$ is the resistance between the first side upper leg 102a of the battery terminal 100 and the device terminal 18, $R_2$ is the resistance between the first side lower leg 102b of the battery terminal 100 and the device terminal 18, $R_3$ is the resistance between the second side upper leg 104a of the battery terminal 100 and the device terminal 18, and $R_4$ is the resistance between the second side lower leg 104b of the battery terminal 100 and the device terminal 18.

FIGS. 18A and 18B illustrate this feature.

One drawback of this design is illustrated in FIG. 3. If the device terminal is positioned offset from its intended position, the contact area between the battery terminal and the device terminal will be reduced.

U.S. Pat. No. 7,789,708 discloses another bifurcated terminal design. This design places a first contact area of a first leg of the bifurcated terminal in front of a second contact area of a second leg of the bifurcated terminal. The first and second contact areas of the bifurcated terminal are aligned in a mating direction with a mating pin. Each of the first and second contact areas have a width approximately equal to a width of the mating pin. As such, the second contact area only provides a contact area equivalent to the first contact area. As such, the equivalent resistance of this configuration only provides half the resistance of a single contact area. This is very similar to the terminal arrangement illustrated in FIGS. 2-4.

SUMMARY

An aspect of the present invention includes a battery terminal comprising a pair of upper legs and a pair of lower legs. The upper legs form a first tulip at a distal end and the lower legs form a second tulip at the distal end. The first tulip is configured to engage, mate in a mating direction and contact a device contact at a first plane of contact and the second tulip is configured to engage, mate in the mating direction, and contact the device terminal at a second plane of contact. The first tulip has a first dimension perpendicular to the mating direction that contacts the device terminal and the second tulip has a second dimension perpendicular to the mating direction that contacts the device terminal. The first dimension is different than the second dimension. The first dimension is approximately twice the second dimension.

Another aspect of the present invention includes a battery pack having a housing and at least one opening in the housing providing access to an internal space of the housing and at least one terminal positioned in the internal space and accessible through the at least one opening. The terminal comprises a pair of upper legs and a pair of lower legs. The upper legs form a first tulip at a distal end of the terminal and the lower legs form a second tulip at the distal end of the terminal. The first tulip is configured to engage, mate with and contact a device contact at a first plane of contact generally/substantially perpendicular to the mating direction and the second tulip is configured to engage, mate with, and contact the device terminal at a second plane of contact generally/substantially perpendicular to the mating direction and generally/substantially parallel to the first plane of contact. The first tulip has a dimension perpendicular to a mating direction that contacts the device terminal and the second tulip has a dimension perpendicular to the mating direction that contacts the device terminal. The first tulip dimension is approximately twice the second tulip dimension.

Implementations of this aspect may include one or more of the following features.

Advantages may include one or more of the following.

These and other advantages and features will be apparent from the description and the drawings.

BRIEF DESCRIPTION OF THE DRAWINGS

FIG. 18A is side view of a conventional battery terminal and a device terminal fully mated.

FIG. 18B is an equivalent circuit diagram representative of the conventional battery terminal and the device terminal of FIG. 18A.

FIG. 19A is a side view of an exemplary battery terminal of the present invention and a device terminal fully mated.

FIG. 19B is an equivalent circuit diagram representative of the exemplary battery terminal and the device terminal of FIG. 19A.

DETAILED DESCRIPTION

Figure 1:
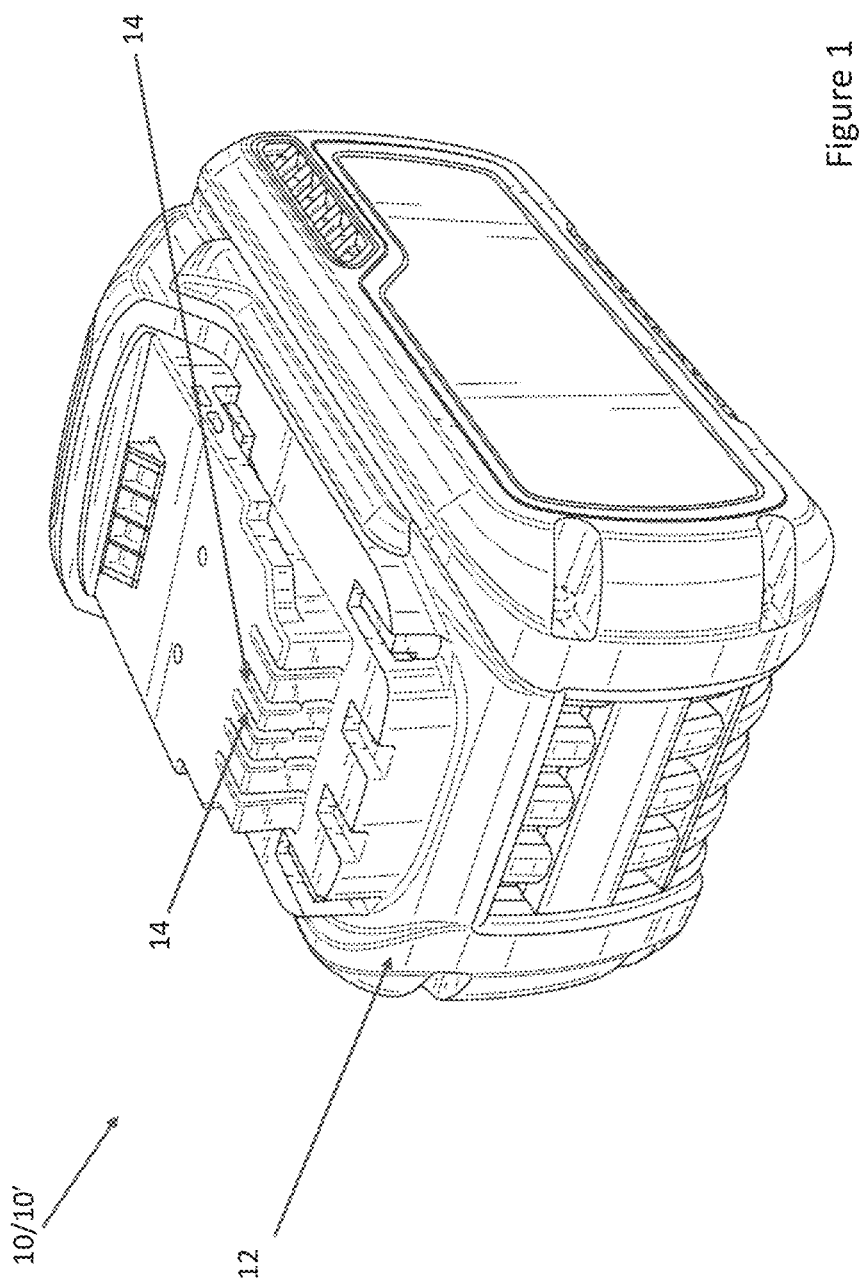
FIG. 1 is an exemplary embodiment of battery pack.
Figure 2:
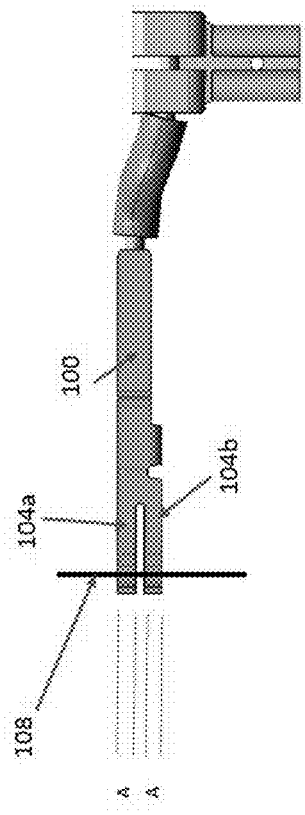
FIG. 2 is an exemplary embodiment of a conventional battery terminal.
Figure 4:
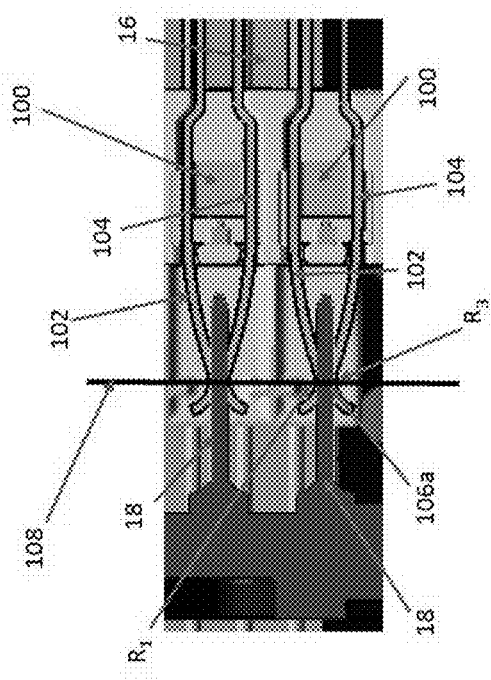
FIG. 4 is a top view of the exemplary battery terminal mated to the device terminal.
Figure 3:
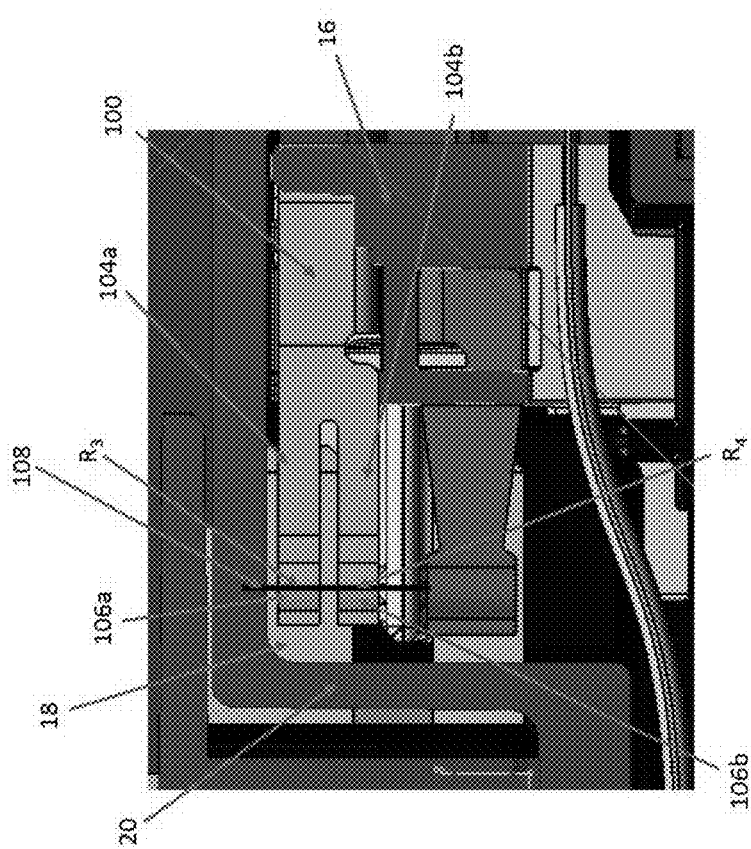
FIG. 3 is a side view of the exemplary battery terminal mated to a device terminal.
Figures 5, 6, 7:
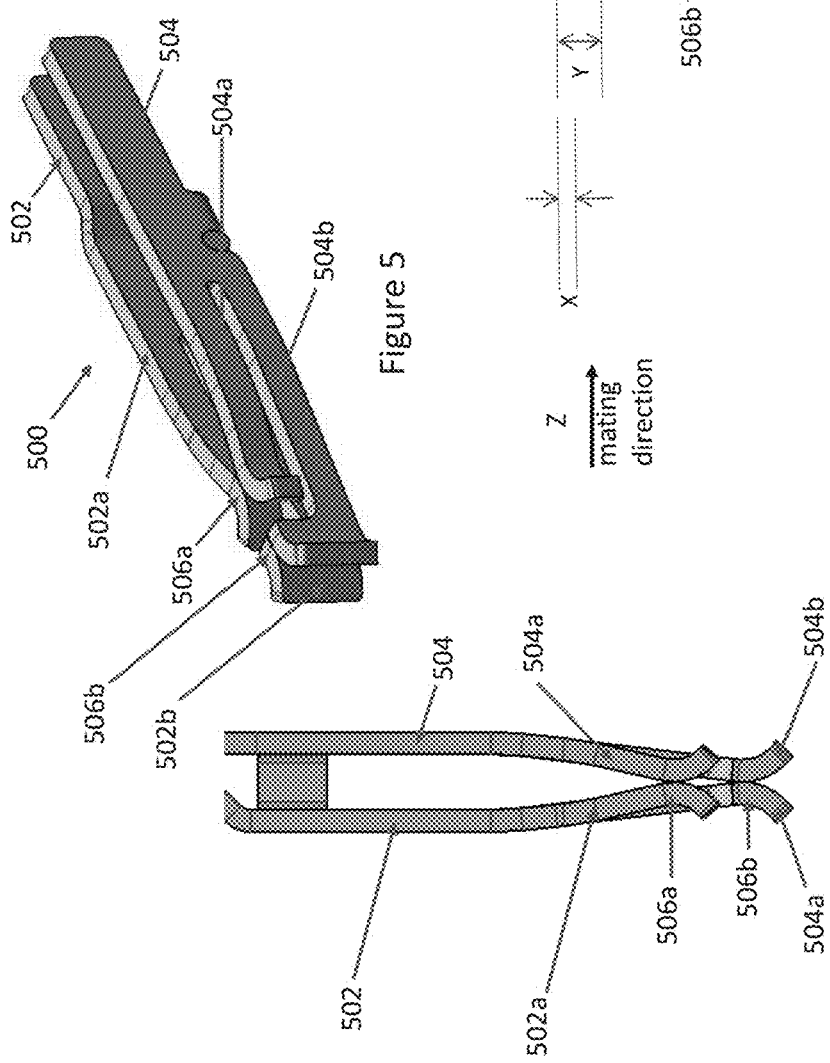
FIG. 5 is a perspective view of an exemplary embodiment of a battery terminal of the present invention.
FIG. 6 is a top view of the exemplary battery terminal of FIG. 5.
FIG. 7 is a side view of the exemplary battery terminal of FIG. 5.

Referring to FIGS. 5-7, there is illustrated an exemplary embodiment of a battery terminal 500 of a battery pack 10' of the present invention. As illustrated in these Figures, the battery terminal comprises a first side 502 and a second side 504. The first side 502 of the battery terminal 500 is bifurcated into an upper leg 502a and a lower leg 502b at a distal end of the first side 502. The second side 504 of the battery terminal 500 is bifurcated into an upper leg 504a and a lower leg 504b at a distal end of the second side 504. The upper legs 502a, 504a form a first tulip 506a at a distal end of the upper legs 502a, 504a. The lower legs 502b, 504b form a second tulip 506b at a distal end of the lower legs 502b, 504b.

The first and second tulips 506a, 506b are configured to engage, receive, mate with and contact a blade-type terminal 18 of a device, for example, a power tool or a battery charger. The device moves a mating direction (indicated by arrow Z) when mating with the battery pack 10' and the battery terminal 500.

The first and second lower legs 502b, 504b have an "L" or "J" shape such that a portion of the first and second lower legs 502b, 504b extend along a portion of the first and second upper legs 502a, 504a, respectively and then a portion of the first and second lower legs 502b, 504b bend or angle around the distal end of the first and second upper legs 502a, 504a, respectively. The first tulip 506a has a dimension X in a direction perpendicular to the mating direction Z. The second tulip 506b has a dimension Y in a direction perpendicular to the mating direction Z. The dimension Y is approximately twice the dimension X.

Figure 8:
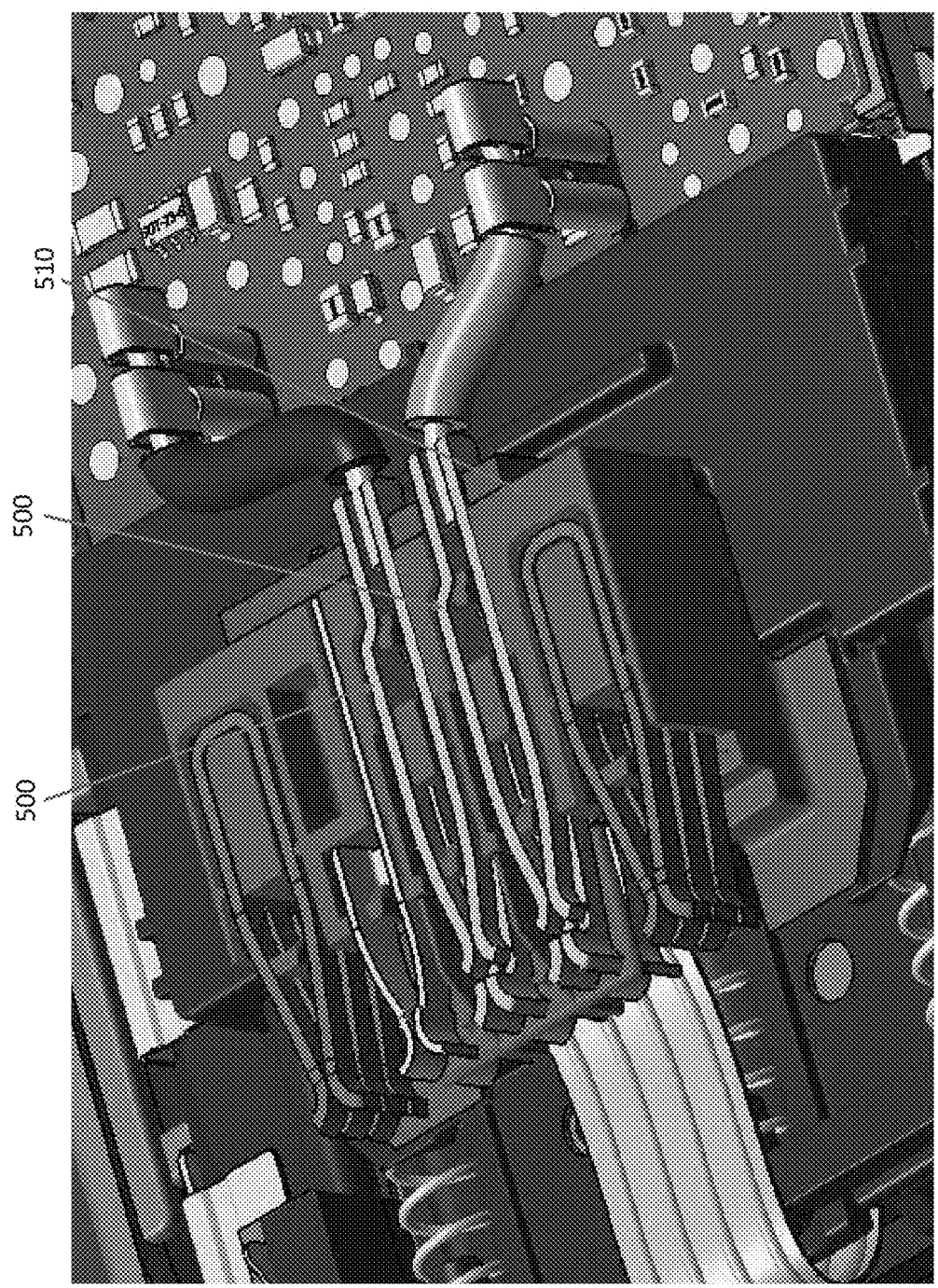
FIG. 8 is a perspective view of the exemplary battery terminal of FIG. 5 in a terminal block.

FIG. 8 illustrates a pair of the exemplary battery terminals 500 positioned in a battery terminal block 510.

Figure 9:
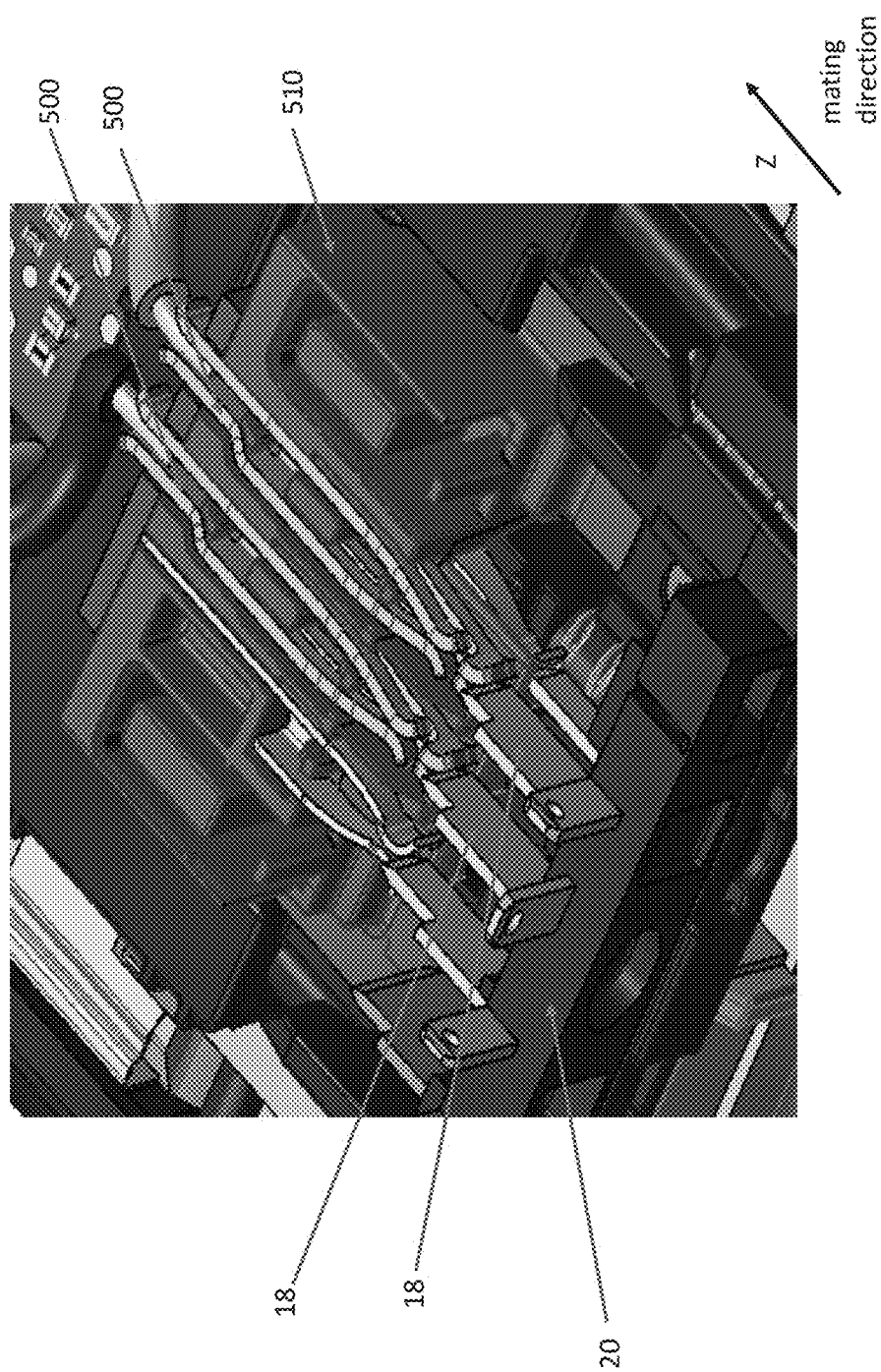
FIG. 9 is a perspective view of the exemplary battery terminal and the battery terminal block of FIG. 8 and a device terminal and terminal block just prior to mating.
Figure 11:
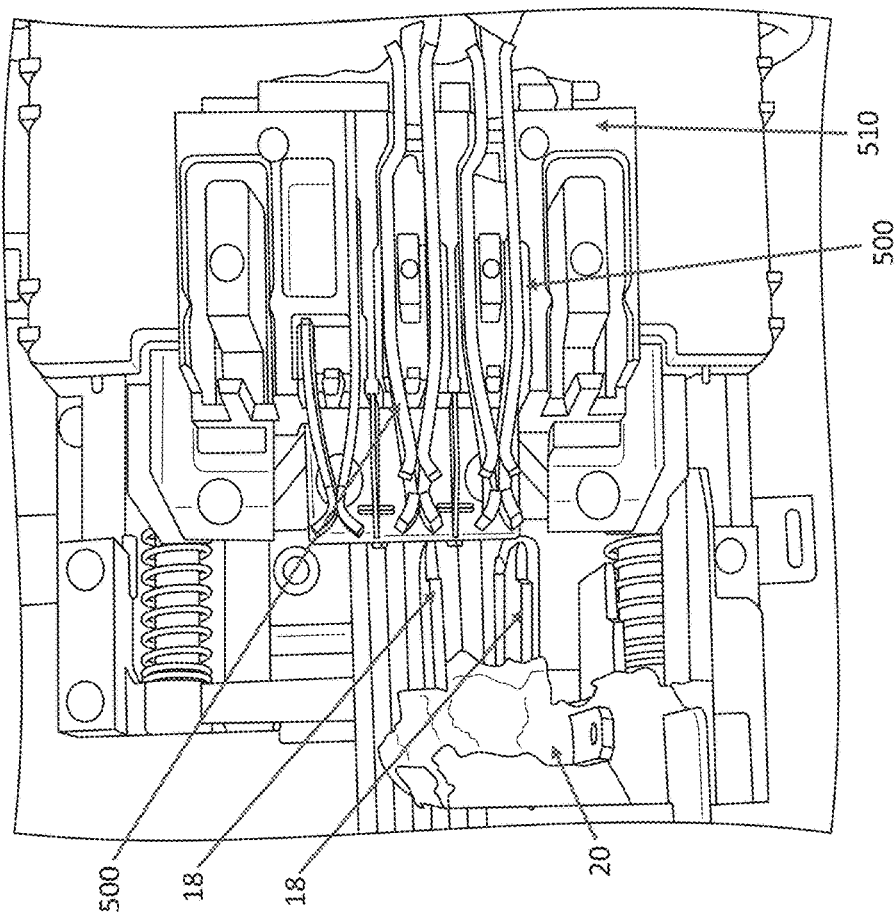
FIG. 11 is a top view of the exemplary battery terminal and the battery terminal block and the device terminal and terminal block of FIG. 9 just prior to mating.
Figure 10:
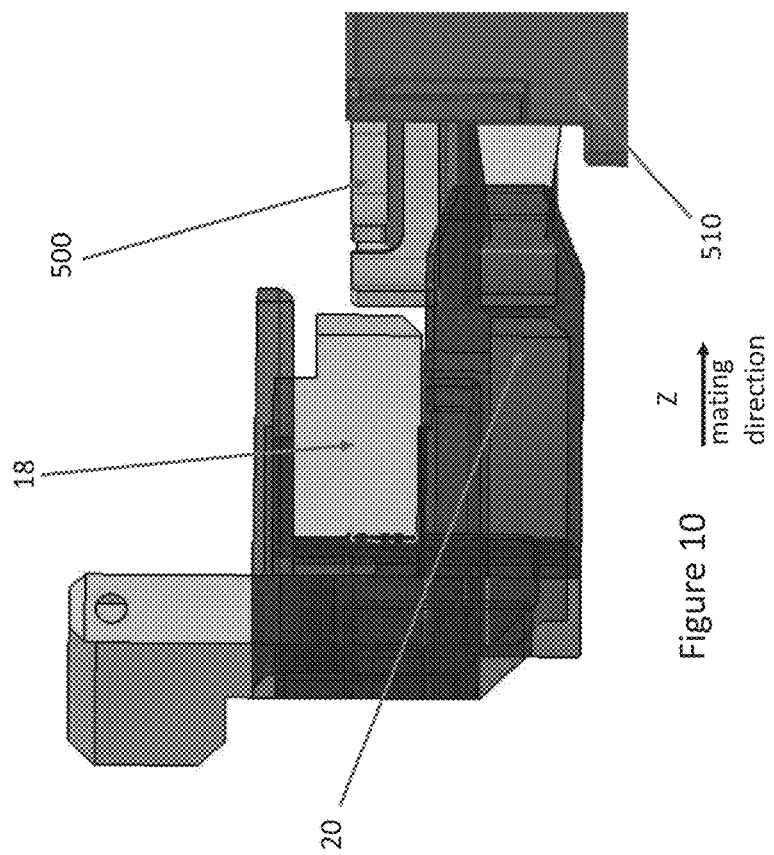
FIG. 10 is a side view of the exemplary battery terminal and the battery terminal block and the device terminal and terminal block of FIG. 9 just prior to mating.

FIGS. 9-11 illustrate the pair of exemplary battery terminals 500 positioned in the battery terminal block 510 and a set of device terminals 18 positioned in a device terminal block 20. The device terminals 18 are illustrated just prior to mating with the battery terminals 500.

Figure 12:
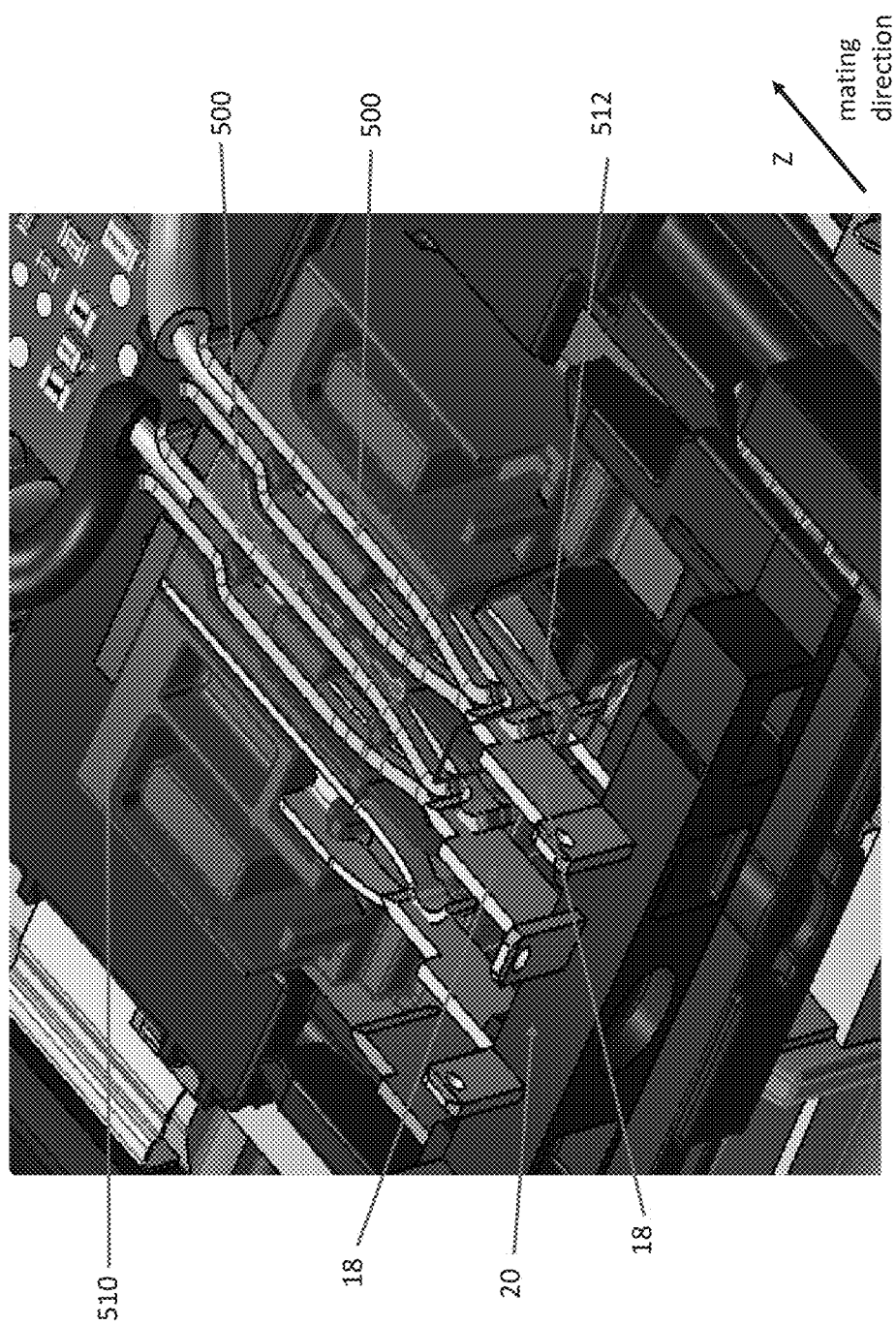
FIG. 12 is a perspective view of the exemplary battery terminal and the battery terminal block and the device terminal and terminal block partially mated.
Figure 14:
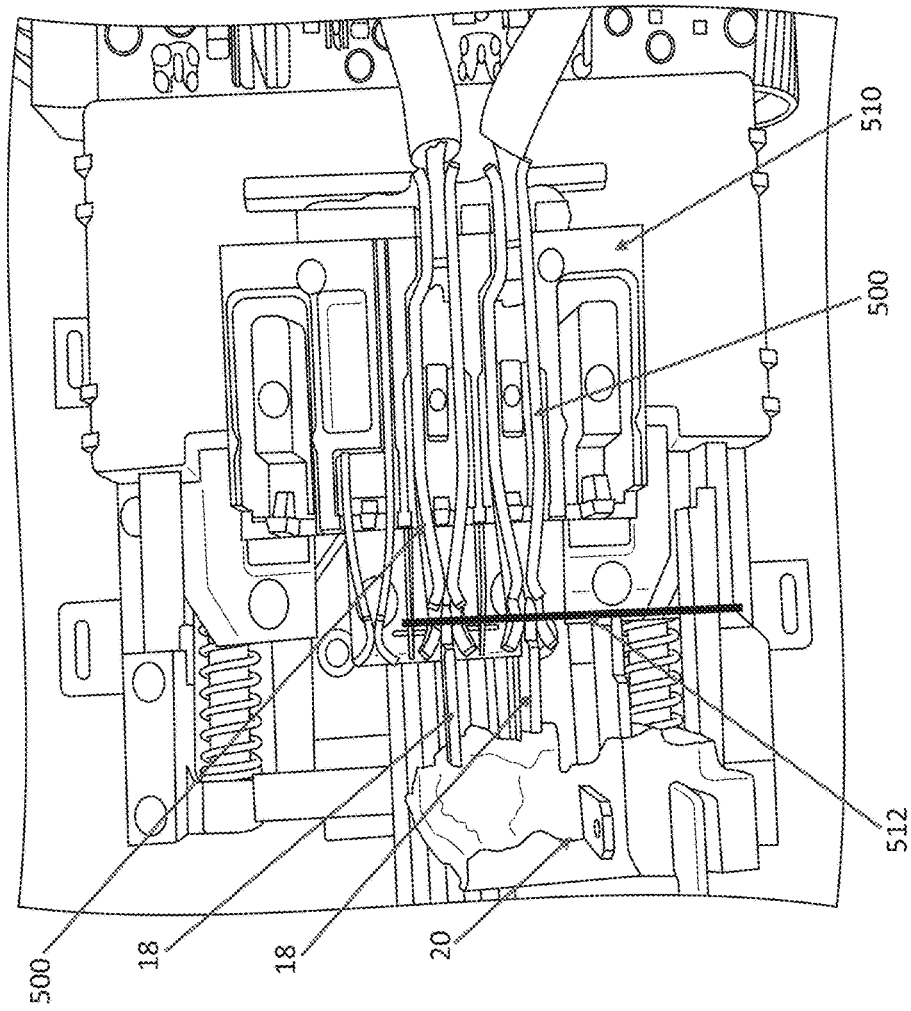
FIG. 14 is a top view of the exemplary battery terminal and the battery terminal block and the device terminal and terminal block of FIG. 12 partially mated.
Figure 13:
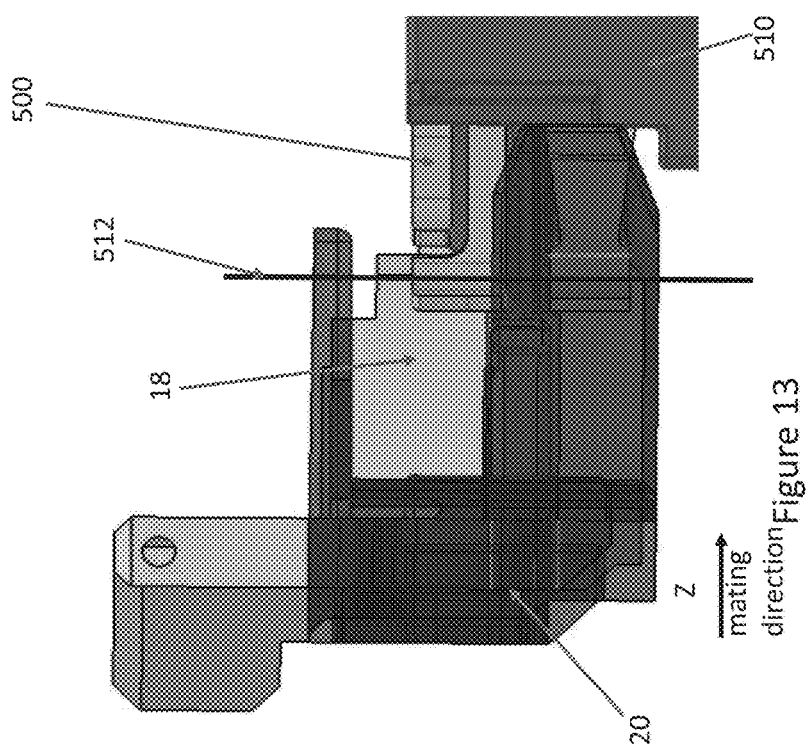
FIG. 13 is a side view of the exemplary battery terminal and the battery terminal block and the device terminal and terminal block of FIG. 12 partially mated.

FIGS. 12-14 illustrate the pair of exemplary battery terminals 500 positioned in the battery terminal block 508 and the set of device terminals 18 positioned in the device terminal block 20. The device terminals 18 are illustrated having mated with the second tulip 506b but prior to mating with the first tulip 506a. A first plane of contact 512 is established between the second tulip 506b (comprising the first side lower leg 502b and the second side lower leg 504b) and the device terminal 18.

Figure 15:
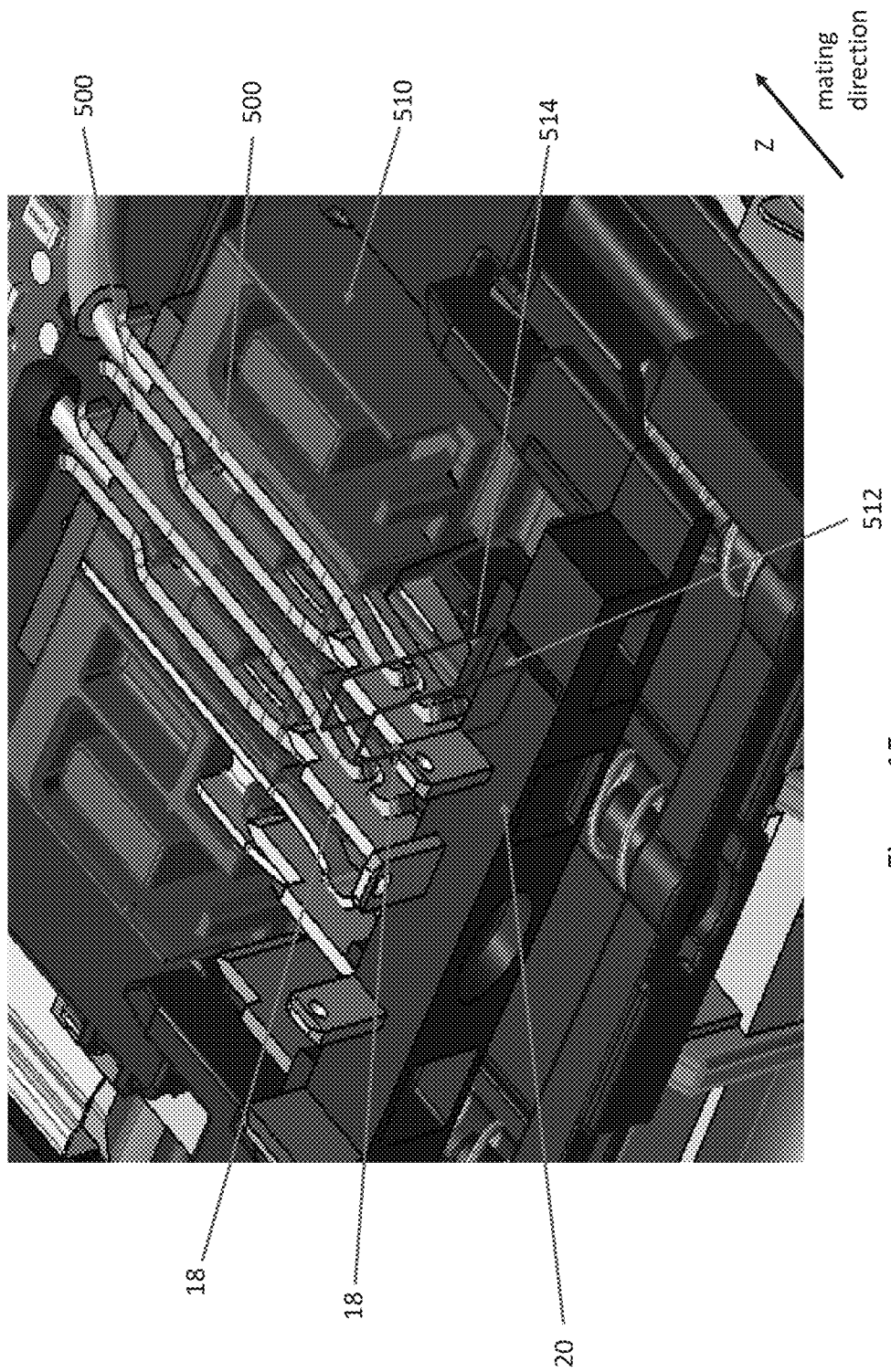
FIG. 15 is a perspective view of the exemplary battery terminal and the battery terminal block and the device terminal and terminal block fully mated.
Figure 17:
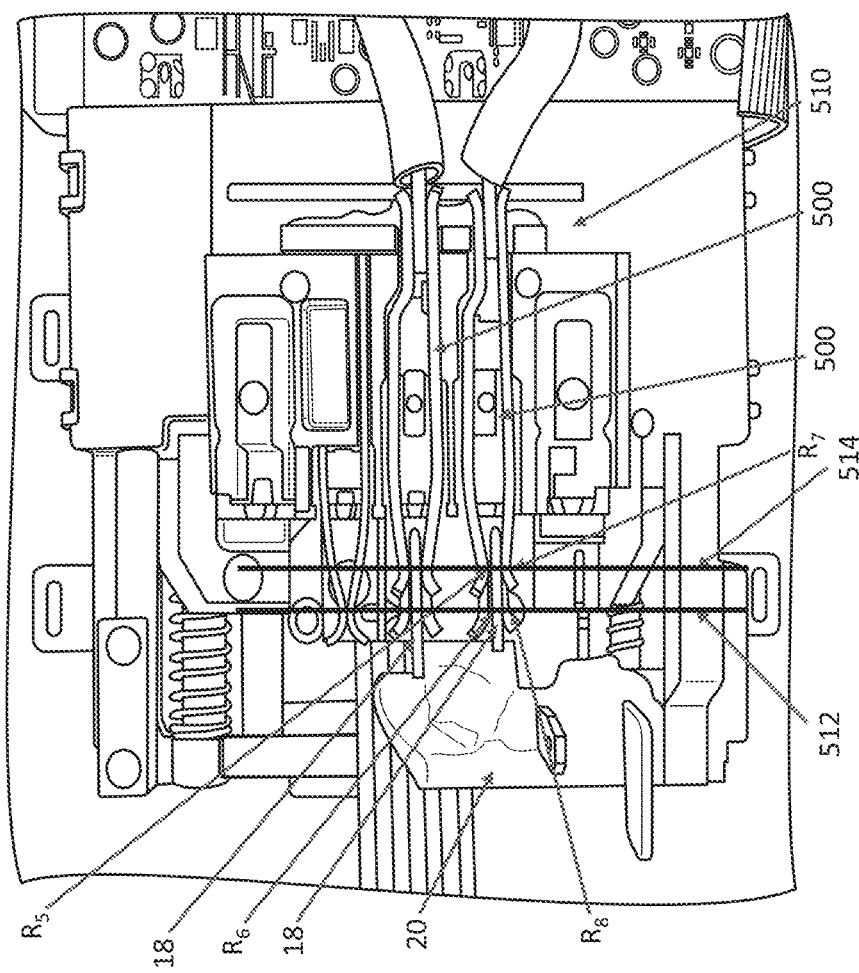
FIG. 17 is a top view of the exemplary battery terminal and the battery terminal block and the device terminal and terminal block of FIG. 15 fully mated.
Figure 16:
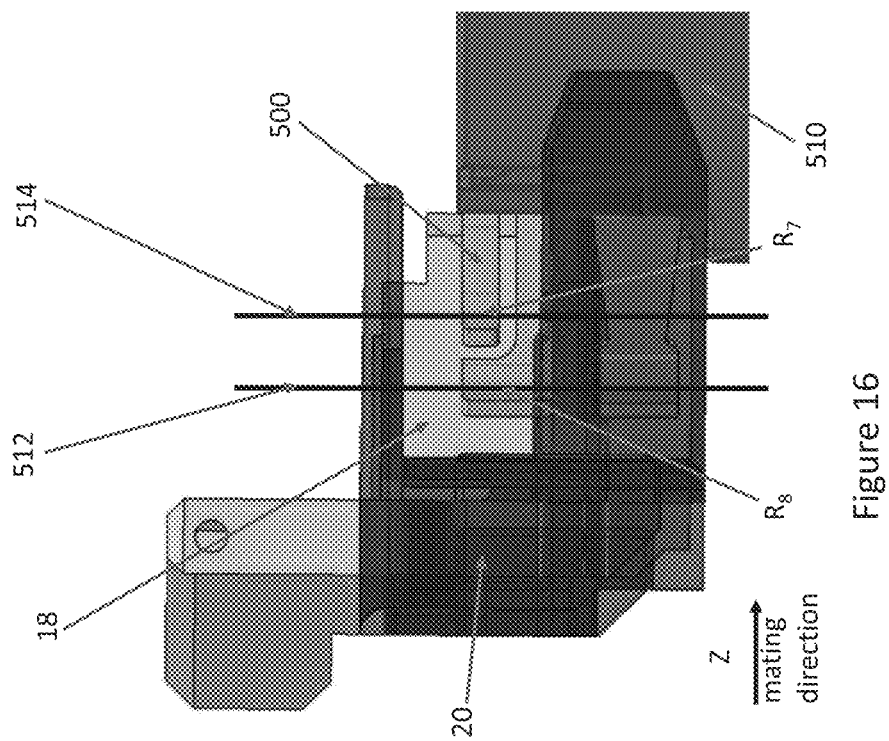
FIG. 16 is a side view of the exemplary battery terminal and the battery terminal block and the device terminal and terminal block of FIG. 15 fully mated.

FIGS. 15-17 illustrate the pair of exemplary battery terminals 500 positioned in the battery terminal block 508 and the set of device terminals 18 positioned in the device terminal block 20. The device terminals 18 are illustrated having mated with the second tulip 506b and with the first tulip 506a (comprising the first side upper leg 502a and the second side upper leg 504a). The first plane of contact 512 is established between the second tulip 506b and the device terminal 18 and a second plane of contact 514 is established between the first tulip 506a and the device terminal 18. The first plane of contact 512 and the second plane of contact 514 are generally/substantially perpendicular to the mating direction Z. The second plane of contact 514 is generally/substantially parallel to the first plane of contact 512. As illustrated in FIGS. 16 and 17, $R_5$ is the resistance between the first side upper leg 502a of the battery terminal 500 and the device terminal 18, $R_6$ is the resistance between the first side lower leg 502b of the battery terminal 500 and the device terminal 18, $R_7$ is the resistance between the second side upper leg 504a of the battery terminal 500 and the device terminal 18 and $R_8$ is the resistance between the second side lower leg 504b and the device terminal 18.

As illustrated in the FIGS. 19A and 19B, the exemplary configuration of the battery terminal 500 of the present invention doubles the area of contact for the lower legs 502b, 504b, as compared to the lower legs 102b, 104b of the conventional battery terminal 100. As is well known, contact resistance varies inversely to contact area. As noted above, the dimension Y (height) of the second tulip 506b that is generally/substantially perpendicular to the mating direction Z is approximately twice the dimension X (height) of the first tulip 506a that is generally/substantially perpendicular to the mating direction Z. As such, the area of contact between the second tulip 506b and the device terminal 18 is approximately twice the area of contact between the first tulip 506a and the device terminal 18. If the resistance between the upper legs 502a,504a (first tulip 506a) and device terminal 18 when the device terminal 18 is fully inserted in the battery terminal 500, as illustrated in FIG. 19A, is R Ohm than the resistance between the lower legs 502b,504b (second tulip 506b) and the device terminal 18 when the device terminal 18 is fully inserted in the battery terminal 500, as illustrated in FIG. 19A is ½ R Ohm.

As there are four (4) total contact areas (in the conventional design: two for the upper tulip and two for the lower tulip; in the inventive design: two for the first tulip and two for the second tulip) the equivalent resistance across the battery terminal 500 and the device terminal 18 will be the resistance across all four contact areas. The equivalent resistance ($R_{eq}$) for parallel resistors is the inverse of the sum of inverses of the individual resistances. In comparing the conventional battery terminal and the inventive battery terminal:

$R_1=R_2=R_3=R_4=R$ Ohm $R_5=R_7=R$ ohm, $R_6=R_8=½$ R Ohm

As noted above, the equivalent resistance between the conventional battery terminal 100 and the device terminal 18, illustrated in FIGS. 18A and 18B is R/4 Ohm.

The equivalent resistance between the battery terminal 500 and the device terminal 18, illustrated in FIGS. 19A and 19B is:

$$R_{eq}=[1/R_5+1/R_6+1/R_7+1/R_8]^{-1}=R/6 \text{ Ohm} \qquad (EQ. 2)$$

As such, the total resistance between the battery pack 10' and the device using the battery terminal 500 is 67% of the total resistance between the conventional battery pack 10 and the device using the conventional battery terminal 100. This provides a 33% decrease in resistance. The lower resistance in the design of the instant application results in less heat generation.

As illustrated in FIGS. 20A, 20B, 21A, and 21B, after repeated uses, the device terminals 18 may either wear down or the position of the terminals 18 in the terminal block 20 may become altered. In addition, in high relative motion environments, for example when the device is an impact driver or reciprocating saw, the device terminals 18 may move relative to the battery terminals 100, 500 during operation.

In high wear or high relative motion environments in battery packs having the conventional battery terminals 100, the contact area between the device terminal 18 and the lower tulip 106b can be severely diminished or the device terminal 18 can disengage from the lower tulip 106b altogether. An exaggerated example of this situation is illustrated in FIG. 20A. In this scenario, the lower tulip 106b may entirely disconnect from the tool terminal 18. The circuit diagram for this situation is illustrated in FIG. 20B.

Figure 20B:
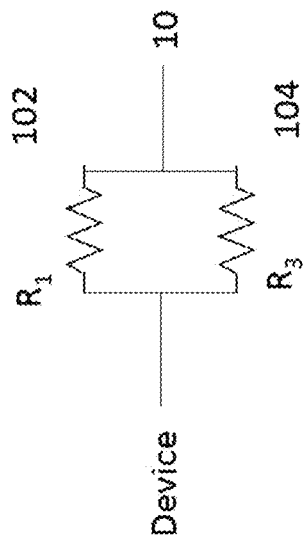
FIG. 20B is an equivalent circuit diagram representative of the conventional battery terminal and the device terminal of FIG. 20A.
Figure 20A:
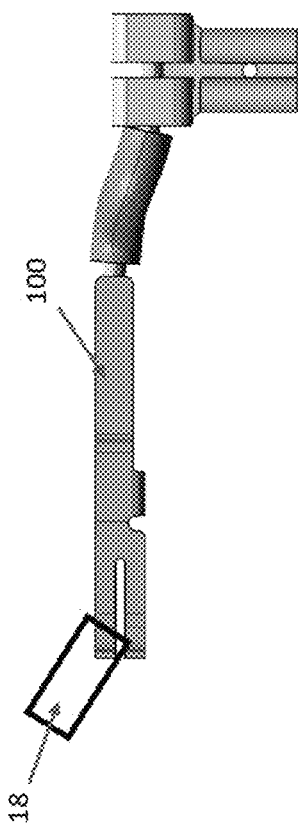
FIG. 20A is a side view of a conventional battery terminal and a device terminal partially mated.

As illustrated in FIGS. 20A and 20B, if $R_1$ represents the resistance between the upper tulip 106a of the first side 102 of the battery terminal 100 and the device terminal 18 and $R_3$ represents the resistance between the upper tulip 106a on the second side 104 of the battery terminal 100 and the device terminal 18 and $R_1=R_3=R$ Ohm (noting that $R_2$ and $R_4$ are zero because the lower tulip 106b of the battery terminal 100 is not contacting the device terminal 18) then the equivalent resistance of the conventional battery terminal 100 and the device terminal 18, as illustrated in FIG. 20A is:

$$R_{eq}=[1/R_1+1/R_3]^{-1}=R/2 \text{ Ohm} \qquad (EQ. 3)$$

Figure 21B:
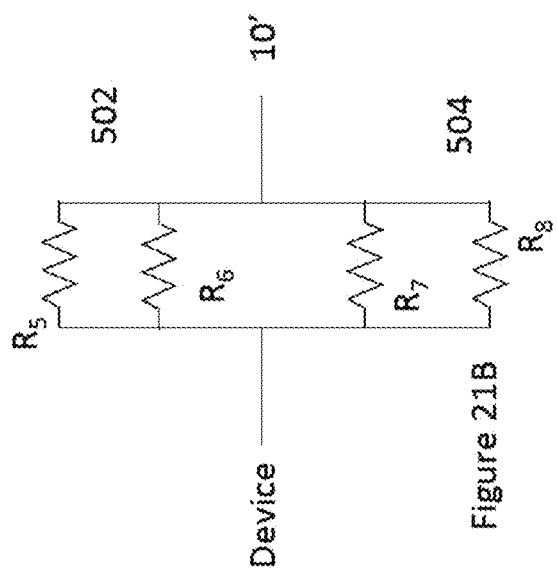
FIG. 21B is an equivalent circuit diagram representative of the exemplary battery terminal and the device terminal of FIG. 21A.
Figure 21A:
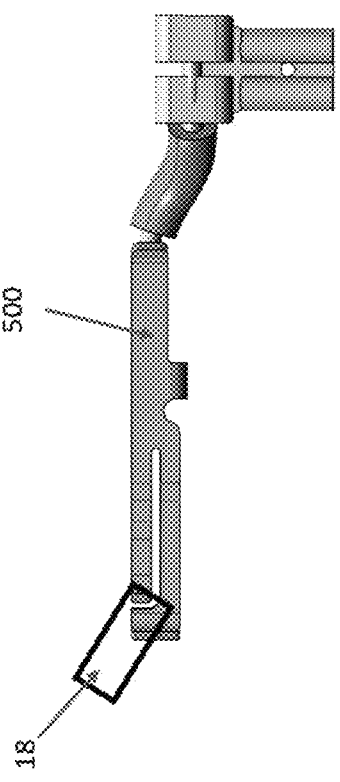
FIG. 21A is a side view of an exemplary battery terminal of the present invention and a device terminal partially mated.

As illustrated in FIGS. 21A and 21B, if $R_5$ represents the resistance between the first tulip 506a of the first side 502 of the battery terminal 500 and the device terminal 18 and $R_6$ represents the resistance between the first tulip 506a of the second side 504 of the battery terminal 500 and $R_7$ represents the resistance between the second tulip 506b of the first side 502 of the battery terminal 500 and the device terminal 500 and $R_8$ represents the resistance between the second tulip 506b of the second side 504 of the battery terminal 500 and $R_5=R_6=R_7=R_8=R$ Ohm (noting that in this scenario $R_5=R_6=R_7=R_8$ because the device terminal is only partially coupled to the second tulip 506b of the battery terminal 500) then equivalent resistance of the battery terminal 500 and the device terminal 18, as illustrated in FIG. 21A is:

$$R_{eq}=[1/R+1/R+1/R+1/R]^{-1}=R/4 \qquad (EQ. 4)$$

If this occurs the battery terminal 500 will provide similar equivalent resistance to the convention battery terminal 100 in optimal circumstances.

In this worst-case scenario, the design of the conventional battery terminal 100 creates double the resistance as compared to the battery terminal 500.

Numerous modifications may be made to the exemplary implementations described above. These and other implementations are within the scope of this application.

The invention claimed is:

1. A battery terminal comprising:
  a pair of upper legs and a pair of lower legs, the upper legs forming a first tulip at a distal end and the lower legs forming a second tulip at the distal end, the first tulip configured to engage, mate in a mating direction and contact a device contact at a first plane of contact and the second tulip configured to engage, mate in the mating direction, and contact the device terminal at a second plane of contact, the second plane of contact being offset from the first plane of contact in the mating direction.

2. The battery terminal, as recited in claim 1, wherein the first tulip has a first dimension perpendicular to the mating direction that contacts the device terminal and the second tulip has a second dimension perpendicular to the mating direction that contacts the device terminal, the first dimension being different than the second dimension.

3. The battery terminal, as recited in claim 2, wherein the first dimension is approximately twice the second dimension.

4. The battery terminal, as recited in claim 1, wherein a first side of the battery terminal is bifurcated into a first of the pair of upper legs and a first of the pair of lower legs and a second side of the battery terminal is bifurcated into a second of the pair of upper legs and a second of the pair of lower legs and wherein the upper legs contact the device contact on opposing sides of the device contact and the lower legs contact the device contact on opposing sides of the device contact.

5. The battery terminal, as recited in claim 1, wherein the first and second lower legs have an L shape such that a portion of the first and second lower legs extend along a portion of the first and second upper legs, respectively and a portion of the first and second lower legs bend around a distal end of the first and second upper legs, respectively.

6. The battery terminal, as recited in claim 1, wherein the first plane of contact and the second plane of contact are substantially perpendicular to the mating direction and the second plane of contact is substantially parallel to the first plane of contact.

7. The battery terminal, as recited in claim 1, wherein there is a first resistance $R_1$ between a first of the pair of upper legs and the device contact, a second resistance $R_2$ between a second of the pair of upper legs and the device contact, a third resistance $R_3$ between a first of the pair of lower legs and the device contact, and fourth resistance $R_4$ between a second of the pair of lower legs and the device contact and wherein the first resistance $R_1$ is approximately equal to the second resistance $R_2$ and the third resistance $R_3$ is approximately equal to the fourth resistance $R_4$ and the first resistance $R_1$ is approximately equal to twice the third resistance $R_3$ and an equivalent resistance $R_{eq}$ between the battery terminal and the device terminal is $[1/R_1+1/R_2+1/R_3+1/R_4]^{-1}=R/6$ Ohm.

* * * * *